United States Patent
Van Heugten

(10) Patent No.: US 11,226,533 B2
(45) Date of Patent: Jan. 18, 2022

(54) MULTI-DEPTH LIQUID CRYSTAL ELECTRODE LAYER LENS

(71) Applicant: e-Vision Smart Optics, Inc., Sarasota, FL (US)

(72) Inventor: Anthony Van Heugten, Sarasota, FL (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 0 days.

(21) Appl. No.: 17/285,346

(22) PCT Filed: Dec. 7, 2020

(86) PCT No.: PCT/US2020/063527
§ 371 (c)(1),
(2) Date: Apr. 14, 2021

(87) PCT Pub. No.: WO2021/113792
PCT Pub. Date: Jun. 10, 2021

(65) Prior Publication Data
US 2021/0318589 A1    Oct. 14, 2021

Related U.S. Application Data

(60) Provisional application No. 62/944,483, filed on Dec. 6, 2019.

(51) Int. Cl.
*G02F 1/29* (2006.01)

(52) U.S. Cl.
CPC .......... *G02F 1/29* (2013.01); *G02F 2201/122* (2013.01)

(58) Field of Classification Search
None
See application file for complete search history.

(56) References Cited

U.S. PATENT DOCUMENTS 4,904,063 A    2/1990 Okada et al.
5,089,023 A    2/1992 Swanson
(Continued)

FOREIGN PATENT DOCUMENTS

JP    2012123041 A    6/2012

OTHER PUBLICATIONS

International Search Report and Written Opinion in International Patent Application No. PCT/US2020/063527 dated Mar. 10, 2021, 13 pages.

*Primary Examiner* — Ryan Crockett
(74) *Attorney, Agent, or Firm* — Smith Baluch LLP

(57) ABSTRACT

A typical liquid crystal lens includes liquid crystal sandwiched between transparent substrates, which are patterned with ring electrodes. Applying a voltage across the electrodes causes the liquid crystal molecules to rotate, changing their apparent refractive index and the lens's focal length. The ring electrodes are separated by gaps and get narrower toward the lens's periphery. If the ring electrodes are too narrower, their cannot switch the liquid crystal well. To address this problem, an inventive liquid crystal lens includes a substrate with a stepped surface that defines concentric liquid crystal regions with thicknesses that increase with lens radius. Each region is switched by a different set of ring electrodes, which may be on, under, or opposite the stepped surface. Within each region, the ring electrodes get narrower farther from the lens's center. But the ring electrodes' widths also increase with liquid crystal thickness, offsetting the decrease in width that degrades lens performance.

31 Claims, 10 Drawing Sheets

(56) References Cited

U.S. PATENT DOCUMENTS

| | | | |
|---|---|---|---|
| 9,329,309 B2 | 5/2016 | Van Heugten | |
| 10,054,725 B2 | 8/2018 | Van Heugten | |
| 10,216,060 B2 * | 2/2019 | Li | G02F 1/134309 |
| 2006/0164593 A1 | 7/2006 | Peyghambarian et al. | |
| 2007/0109489 A1 | 5/2007 | Nomura et al. | |
| 2008/0180630 A1 | 7/2008 | Clarke et al. | |
| 2009/0015738 A1 | 1/2009 | Hong et al. | |
| 2009/0284827 A1 | 11/2009 | Verstegen | |
| 2011/0069243 A1 | 3/2011 | Chang | |
| 2011/0267570 A1 | 11/2011 | Saito et al. | |
| 2013/0002970 A1 | 1/2013 | Baek et al. | |
| 2014/0043672 A1 | 2/2014 | Clarke et al. | |
| 2015/0138498 A1 * | 5/2015 | Lin | G02F 1/134309 |
| | | | 349/200 |
| 2016/0291408 A1 | 10/2016 | Yoon et al. | |
| 2018/0246354 A1 * | 8/2018 | Popovich | G02F 1/1334 |
| 2021/0231978 A1 * | 7/2021 | Wang | G02F 1/133 |

* cited by examiner

MULTI-DEPTH LIQUID CRYSTAL ELECTRODE LAYER LENS

CROSS-REFERENCE TO RELATED APPLICATIONS

This application is a U.S. national stage filing under 35 U.S.C. 371 of International Application No. PCT/US2020/063527, filed on Dec. 7, 2020, which claims the priority benefit of U.S. Application No. 62/944,483, filed on Dec. 6, 2019, each of which is incorporated herein by reference in its entirety.

BACKGROUND

One type of liquid crystal lens is comprised of liquid crystal sealed between opposing faces of two transparent substrates. The lens includes transparent electrodes and alignment layers on the opposing faces of the transparent substrates. The alignment layers align the liquid crystal with respect to the substrates. One of the transparent electrodes may be patterned, e.g., in the shape of rings or pixels. The other transparent electrode may be unpatterned and acts as a ground plane.

Applying a voltage to the patterned electrodes creates an electric field across the liquid crystal. The liquid crystal molecules, which are anisotropic, align themselves with the electric field, changing the local refractive index. Applying a voltage gradient to the patterned electrodes creates a gradient electric field, with each electrode producing a different electric field than its neighbor. Because the electric field influences the index of refraction of the liquid crystal, the gradient electric field results in a gradient of change in index of refraction in the liquid crystal, which can in turn produce an optical lensing effect. The patterned electrodes may be circular, linear, elliptical, or almost any other shape desired for the refractive index gradient produced in the liquid crystal and the corresponding changes to the wave front transmitted through the lens.

Circular ring electrodes are common in liquid crystal lenses. These ring electrodes are typically formed lithographically from a layer of Indium Tin Oxide (ITO) that is between 5 nm and 200 nm thick. The ITO layer is deposited on a first transparent substrate, such as fused silica glass, that can survive the vacuums, temperatures, and handling of a lithography process. The patterned electrodes are coated with a layer of insulation, such as $SiO_2$ or SU-8 photoresist. This insulating layer covers the ring electrodes and fills gaps between adjacent ring electrodes, electrically isolating the ring electrodes from each other.

Buss lines connect the ring electrodes to a voltage supply. These buss lines are thin traces of a conductive material, such as nickel, that is deposited on the insulation layer and patterned lithographically. Each buss line connects to a corresponding ring electrode through a via hole formed in the insulating layer. A lens with a small number of electrodes (e.g., 20 or fewer) may have one buss line per electrode. In a lens with a larger number of electrodes (e.g., hundreds of electrodes), each buss line may connect to subset of electrodes, which are connected to each other via resistive bridges. (For more on resistive bridges, see, e.g., U.S. Pat. No. 10,599,006 to Van Heugten et al., which is entitled "Electro-Active Lenses with Raised Resistive Bridges" and incorporated herein by reference in its entirety.)

The ring electrodes, buss lines, and insulating layer are coated with an alignment layer, such as the SUNEVER® line of polyimide resin chemicals made by the Nissan Chemical Corporation, Tokyo, Japan. The lens's other transparent substrate may be coated with an unpatterned ITO layer that serves as a ground plane and an alignment layer. Liquid crystal material, such as Merck MLC-2140 liquid crystal, is sealed between the coated surfaces of the transparent substrates to form the lens.

In liquid crystal lenses with ring electrodes, the ring electrodes become progressively narrower farther from the center of the lens, while the gaps between neighboring ring electrodes are all about the same width. A problem with this approach is that the total electric field amplitude decreases with lens radius because there is no electric field generated above the gaps between ring electrodes. As a result, beyond a certain distance, for example, at a radius of 10 mm in a typical lens, the ring electrodes become too narrow to generate an effective total electric field: the ratio of the width of the electrode to the width of the gaps between adjacent electrodes becomes too small to generate an effective total electric field at the lens's periphery.

For example, if an electrode is 100 µm wide and the gaps on either side of that electrode are 3 µm wide, about 3% of the electric field acting upon the liquid crystal at that point is disrupted, causing a relatively small undesired optical effect. As the lens becomes larger, the gap remains consistent, but the electrodes become narrower, causing the ratio of electrode width to gap width to decrease. At the point in the lens where the electrode width is 30 µm and the gap width is still 3 µm, the gap width is 10% of the electrode width, disrupting approximately 10% of the electric field. A disruption of 3% may be tolerable, but a disruption of 10% (and a resulting lens degradation of that amount) may not be. This disruption limits the diameter of the liquid crystal lens, the number of ring electrodes, and/or the minimum ring electrode width.

One way of increasing the lens diameter before the electrode-width-to-gap-width ratio becomes too small is to increase the thickness of the liquid crystal. As the liquid crystal layer thickness increases, so does the electric field used to switch the liquid crystal material, and so do the widths of the electrode rings used to generate the electric field. In essence, every dimension of the lens is scaled up except the gap width, which is typically set by the spatial resolution of the lithography used to pattern the electrodes. Unfortunately, increasing the thickness of the liquid crystal layer causes the lens to switch more slowly (i.e., the lens's switching speed decreases), which is undesirable, limiting the usefulness of this solution.

SUMMARY

The present technology enables larger electrode-based liquid crystal lenses while reducing or minimizing the degradation of switching speed and preventing the ratio of the electrode width to the gap width from becoming unacceptably low. Inventive lenses are suitable for use in or as ophthalmic lenses, such as spectacle lenses, contact lenses, and intraocular lenses. They can also be used in mixed, augmented, and virtual reality systems to adjust the apparent locations of virtual objects perceived by the viewers, as well as in imaging cameras, night vision sensors, and any other optical devices that uses lenses.

The present technology includes an electro-active lens with a first substrate, second substrate, liquid-crystal material, ground electrode, and plurality of ring electrodes. The first substrate has an even (e.g., flat or smooth) surface. The second substrate has a stepped surface opposite the even surface. This stepped surface has at least a first step and a second step. The liquid-crystal material is disposed between the even surface and the stepped surface. The ground electrode is disposed on either the even surface or the stepped surface. The ring electrodes are disposed on the other of the even surface or the stepped surface, with at least two ring electrodes for the first step and at least two ring electrodes for the second step. In operation, the ring electrodes apply a voltage across the liquid-crystal material. This voltage generates an electric field that cause the liquid-crystal molecules to re-orient themselves, changing the electro-active lens's focal length.

The even surface can be a planar surface or a curved surface.

The stepped surface can be formed by stacked cylinders of different diameters concentric with an optical axis of the electro-active lens. The first step may be higher than the second step by a height selected to provide an optical path distance equal to an integer number of waves at a design wavelength of the electro-active lens.

The first step may have a circular face opposite the even surface and centered on an optical axis of the electro-active lens and the second step has an annular face concentric with the circular face and opposite the even surface. The circular face is separated from the planar surface by a first distance and the annular face is separated from the even surface by a second distance greater than the first distance. The ground electrode can be disposed on the stepped surface, in which case the ring electrodes are disposed on the even surface with at least two ring electrodes for the first step opposite the circular face and at least two ring electrodes for the second step opposite the annular face. Alternatively, the ground electrode can be on the even surface and the ring electrodes can be under the stepped surface with at least two ring electrodes under the circular face and at least two ring electrodes under the annular face. The ground electrode can also be disposed on the even surface and the plurality of ring electrodes can be disposed on the stepped surface with at least two ring electrodes on the circular face and at least two ring electrodes on the annular face. In this case, the electro-active lens may also include a buss line, disposed on a cylindrical face connecting the circular face and the annular face, to connect at least one of the ring electrodes on the circular face to a voltage supply.

The ring electrodes for the first step may include a first electrode having a first diameter and a first width and the ring electrodes for the second step may include a second electrode having a second diameter greater than the first diameter and a second width greater than the first width. There may be at least ten ring electrodes for the first step and at least ten ring electrodes for the second step. Each of the ring electrodes for the first step can have a first area and each of the at least two ring electrodes for the second step can have a second area greater than the first area.

The electro-active lens may also include a first resistive bridge connecting two of the ring electrodes for the first step and a second resistive bridge connecting two of the ring electrodes for the second step. It may also include a first spacer bead having a first diameter between the first step and the even surface and a second spacer bead having a second diameter greater than the first diameter between the second step and the even surface.

Such an electro-active lens can be used to focus incident light. Applying a first voltage to the ring electrodes for the first step actuates a first portion of the liquid-crystal material between the first step and the even surface. Similarly, applying a second voltage to the ring electrodes for the second step actuates a second portion of the liquid-crystal material between the second step and the even surface. This changes the electro-active lens's focal length.

An alternative electro-active lens comprises a first substrate, second substrate, liquid-crystal material, ground electrode, and ring electrodes. The first substrate has an even surface. The second substrate has a stepped surface with at least two steps opposite the even surface. The height difference between these first and second steps is selected to provide an optical path length equal to an integer number of wavelengths at a design wavelength of the electro-active lens. The liquid-crystal material is disposed between the even surface and the stepped surface. The ground electrode is on the stepped surface. And the ring electrodes are on the even surface with at least ten ring electrodes opposite the first step and at least ten ring electrodes opposite the second step.

The ring electrodes opposite the first step can include a first electrode having a first diameter and a first width and ring electrodes for the second step can include a second electrode having a second diameter greater than the first diameter and a second width greater than the first width. Each ring electrode for the first step can have a first area and each ring electrode for the second step can have a second area greater than the first area. There may be at least one hundred ring electrodes for the first step and at least one hundred ring electrodes for the second step. There may also be a first resistive bridge connecting two of the ring electrodes opposite the first step and a second resistive bridge connecting two of the ring electrodes opposite the second step.

Another alternative electro-active lens comprises a first substrate, second substrate, liquid-crystal material, ground electrode, and ring electrodes. The first substrate has an even surface. The second substrate has a stepped surface with at least two steps opposite the even surface. The liquid-crystal material is disposed between the even surface and the stepped surface. The ground electrode is disposed on the stepped surface. There are first ring electrodes, each having the same (first) area and disposed on the even surface opposite the first step, to apply a first voltage across the liquid-crystal material. And there are second ring electrodes, each having the same (second) area and disposed on the even surface opposite the second step, to apply a second voltage across the liquid-crystal material. The second area is greater than the first area.

There may be at least one hundred first ring electrodes and at least one hundred second ring electrodes. There may be a first resistive bridge connecting two first ring electrodes and a second resistive bridge connecting two second ring electrodes.

Yet another electro-active lens includes a first substrate having a curved surface, a second substrate having a stepped surface opposite the even surface, liquid-crystal material disposed between the curved surface and the stepped surface, a ground electrode disposed on the stepped surface, and a plurality of ring electrodes disposed on the curved surface with at least ten ring electrodes opposite the first step and at least ten ring electrodes opposite the second step. The height difference between adjacent steps of the stepped surface may be selected to provide an optical path length equal to an integer number of wavelengths at a design wavelength of the electro-active lens. The electrodes opposite the first step may include a first electrode having a first diameter and a first width and the ring electrodes opposite the second step may include a second electrode having a second diameter greater than the first diameter and a second width greater than the first width. Each ring electrode opposite the first step can have a first area and each ring electrode opposite the second step can have a second area greater than the first area. There may be at least one hundred ring electrodes opposite the first step and at least one hundred ring electrodes opposite the second step. The electro-active lens may also include a first resistive bridge connecting two of the ring electrodes opposite the first step and a second resistive bridge connecting two of the ring electrodes opposite the second step.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
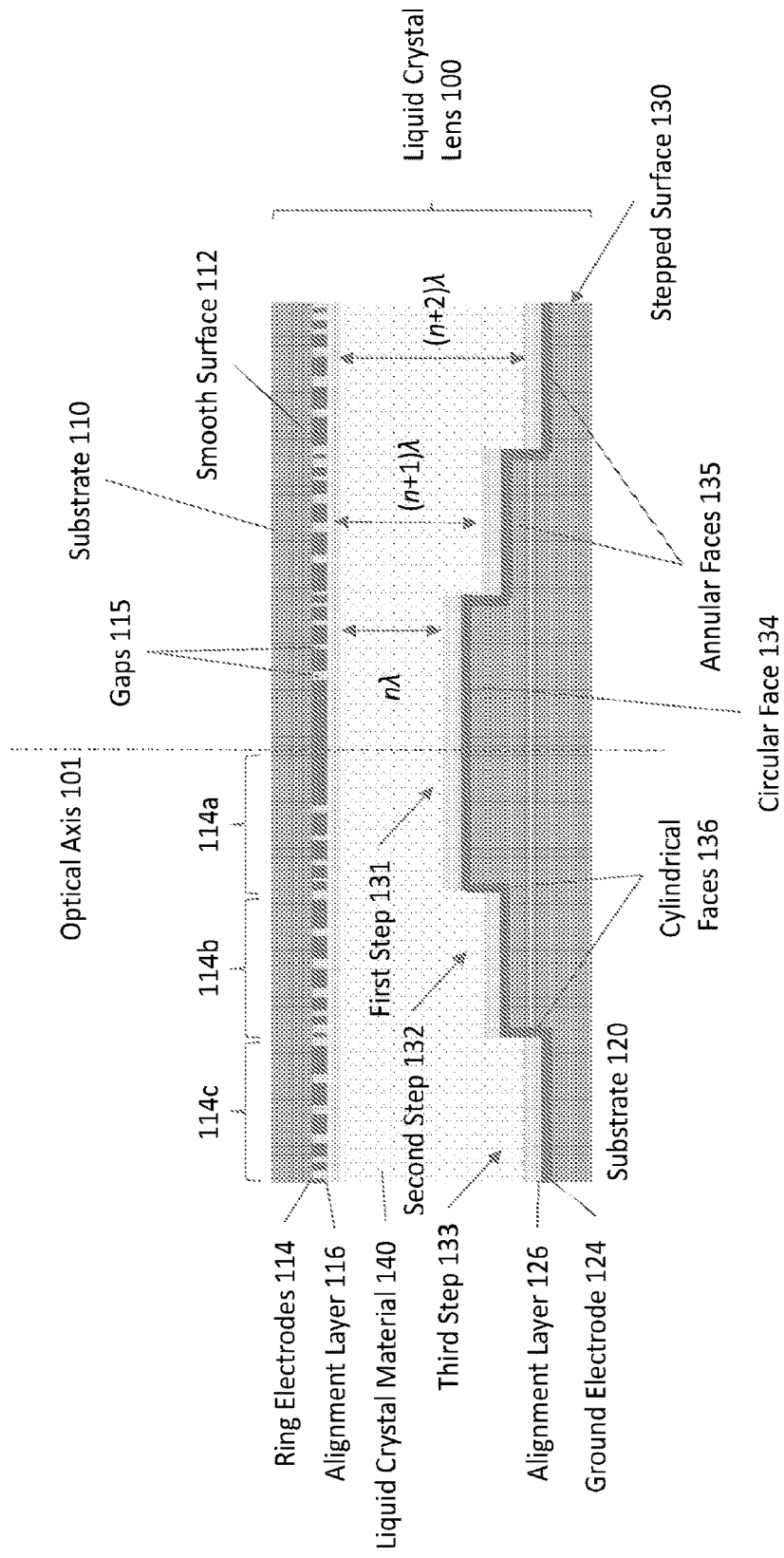
FIG. 1A shows a cross-sectional view of a liquid crystal lens with a single ground plane electrode on a stepped surface opposite ring electrodes on an even planar surface.

The present technology enables electrode-based liquid crystal lenses with larger diameters, relatively fast switching speeds, and higher ratios of electrode width to gap width in their peripheral zones. This is accomplished with multiple thickness layers of liquid crystal, thinner in the center and thicker further from the center of the lens. For a circularly symmetric lens, the liquid crystal regions may be arranged concentrically, with thicknesses increasing as a function of radius and different sets of ring-like or substantially annular electrodes (ring electrodes, for short) for each region. These ring electrodes may be closed loops or loops that are not closed; i.e., there may be a gap in the circle or ring formed by the ring electrode. Likewise, the ring electrodes may or may not be perfectly circular.

Each ring electrode has a width equal to the difference between its outer and inner radii. The widths of the ring electrodes decrease with radius and increase with liquid crystal thickness, resulting in a ring electrode width that varies in stepped sawtooth fashion moving outward from the center of the lens. In the central thin section, the ring electrodes may be designed in the usual manner of becoming progressively narrower. At the radius where the electrode width becomes borderline acceptable, e.g., a ratio of electrode width to gap width of 20 to 1, the thickness of the liquid crystal is increased, for example, doubled, and the width of the ring electrode at that radius is increased correspondingly. The widened electrodes become narrower and narrower the farther they are from the center of the lens until they become unacceptably narrow, at which point the liquid crystal thickness and electrode widths may be increased again. This arrangement can be repeated as many times as desired.

The electrodes may drive the different thickness sections of liquid crystal with different voltages, e.g., with thicker liquid crystal regions driven by higher voltages. These staggered voltages may be provided by ensuring that electrodes in each section of the lens are isolated from each other in the drive control input circuits. Alternatively, the different groups may be connected to the same group of drive control input circuits, then adjustments can be made by resistors.

Such a multi-depth lens may be constructed using lithographic patterning. For example, for a two-layer design, a circular (top-hat-shaped) deposit of SU-8 photoresist or other suitable material could be formed in the center of the surface of one of the lens's substrates to form a stepped surface. The step height (i.e., the thickness of the SU-8 deposit) defines the change in thickness of the liquid crystal layer trapped between the substrates. The ring electrodes may be patterned on the SU-8 deposit, underneath the SU-8 deposit, or on the substrate without the SU-8 deposit.

An example inventive liquid crystal lens has a central section of one substrate with a 10-micron high, 20-millimeter diameter plateau, made from SU-8 photoresist, on a 40 mm diameter circular lens. 10-micron spacer beads are on the plateau, and 20-micron spacer beads are elsewhere, resulting in the central section having a 10-micron thick layer of liquid crystal and the remainder of the lens having a 20-micron thick layer of liquid crystal.

The thin liquid crystal region at the center of an inventive liquid crystal lens may have a higher switching speed than the thicker, peripheral liquid crystal regions. In some cases, this is an acceptable compromise because in many applications (for example, human vision), it is primarily the center of the lens that is being utilized. For example, when such a lens is used in a virtual and/or augmented reality device to correct for the Vergence Accommodation Conflict (VAC; where the brain is fooled into thinking that the image is closer, but the eye is not actually accommodating to a closer object), the speed of the lens switching can be taken into account when positioning the images in the view. For example, consider making a virtual object appear closer and then move laterally across the field of view. If the virtual object should change its virtual position in 100 ms but only the central section of the lens can switch that fast while the peripheral section may take 300 ms to switch, the virtual object can be first located/relocated such that the center lens section brings it to focus in 100 ms. Then 300 ms later, after the peripheral section changed focus to match the central section, the virtual object's location in the field of view may be translated laterally to the lens's peripheral section, which brings the virtual object into correct focus.

Multi-Depth Liquid Crystal Lenses

FIG. 1A shows a cross-section of an inventive liquid crystal lens 100. This liquid crystal lens 100 includes liquid crystal material 140 sealed between a first transparent substrate 110 and a second transparent substrate 120. A suitable liquid crystal is Merck MLC2140, a nematic liquid crystal. Many other manufacturers have liquid crystals available, for example, Chisso in Japan. The first transparent substrate 110 has a smooth surface 112 facing a tiered or stepped surface 122 defined by the second transparent substrate 120. The smooth surface 112 is flat, even, and regular—it has no perceptible projections, lumps, or indentations—and in this example is planar. In other examples, the smooth surface 112 can be smoothly curved, e.g., in the shape of a portion of a spherical, paraboloidal, or aspheric surface.

In this example, the stepped surface 122 defines three steps 131-133 (also called tiers, levels, or plateaus), and this example are shown as concentric with the lens's optical axis 101 (and therefore with each other). In some instances, the tiers are not circular or concentric, for example, they may be oval-shaped or have centers shifted with respect to each other and/or the lens's optical axis, (Other numbers and arrangements of steps are also possible.) The first step 131 has a circular face 134 centered on the optical axis 101 opposite the smooth surface 112 of the first substrate 110; second step 132 and third step 133 have respective annular faces 135 that are also centered on the optical axis 101. The circular face 134 and annular faces 135 are connected by cylindrical faces 136 whose heights are selected to provide an integer multiple (e.g., one) wavelength of optical path difference at the design wavelength. These heights fix the thicknesses of the different regions of the liquid crystal 140. Unlike in a Fresnel lens, which has a surface formed by curved or angled facets, the circular face 134 and annular faces 135 are planar and parallel with each other and perpendicular to the lens's optical axis 101, which is parallel with the cylindrical faces 136.

Geometrically, the stepped surface 122 can be formed by stacking cylinders of monotonically decreasing radii on top of each other. Physically, the stepped surface 122 can be formed by depositing and patterning SU-8 photoresist, silicon dioxide, or another suitable material on a piece of glass or plastic. It can also be formed by 3D printing or molding the second substrate 120 out of resin in the desired shape. Or it can be formed by stamping a suitable material into the desired shape. There are numerous other suitable fabrication methods, including micro-fabrication processes such as electronic circuit fabrication, diamond point turning, etc.

The stepped surface 122, including the circular face 134, annular faces 135, and cylindrical faces 136, is coated with transparent conductive material, such as ITO, that serves as a ground plane electrode 124. In operation, this electrode 124 keeps the entire stepped surface 122 at the same (ground) potential. This coating can be done with sputtering, vapor deposition, or another suitable thin-film coating method. The electrode 124 is coated with a liquid crystal alignment layer 126 that anchors and/or aligns the liquid crystal material 140 with respect to the stepped surface 122.

The ground plane electrode 124 is opposite ring electrodes 114 formed on the smooth surface 112 of the first substrate 110. (The center ring electrode 114 may be in the shape of a circle instead of a ring.) The ring electrodes 114 can be connected to one or more voltage supplies via buss lines and/or resistive bridges as described below. The voltage supplies apply different (e.g., phase-wrapped) voltages to the ring electrodes 114, generating an electric field that causes the liquid crystal 140 between the ring electrodes 114 and the ground plane electrode 124 to realign themselves in a gradient manner. This realignment changes the lens's focal length.

The ring electrodes 114 are separated by gaps 115 and divided into subsets 114a-114c, with one subset for each step 131-133 of the stepped surface 122. There are at least two and possibly more (e.g., 10, 20, 30, 40, 50, 60, 70, 80, 90, 100, or more) ring electrodes 114 per subset 114a-114c/step 131-133. The ring electrodes 114 in each subset can be connected to each other with resistive bridges and to one or more voltage supplies with buss lines as described below.

The widths of the ring electrodes 114 vary as follows: within each subset/for each step, the ring electrodes 114 grow progressively narrower farther from the lens's optical axis 101. (In contrast, the gaps 115 are all about the same width, e.g., about 3 microns.) The ring electrodes 114 also step up in width with liquid crystal thickness/step height. As a result, the outermost ring electrode 114 in each subset is narrower than the innermost ring electrode 114 in the next outer subset. In FIG. 1A, the outermost ring electrode 114 in the first subset 114a is narrower than the innermost ring electrode 114 in the second subset 114b, and the outermost ring electrode 114 in the second subset 114b is narrower than the innermost ring electrode 114 in the third subset 114c. (FIG. 4, described below, shows a plan view of the ring electrodes 114.) The wider ring electrodes on the lower steps 132, 133 can apply higher voltages to the thicker regions of liquid crystal 140. The electrodes are coated with an insulation layer to prevent the buss lines from short circuiting the electrodes. The buss lines pass over electrodes and the insulation layer without making electrical contact with electrodes except at discrete locations.

The smooth surface 112 and ring electrodes 114 are coated with a liquid crystal alignment layer 116, which may be about 40 nm thick, that aligns and/or anchors the liquid crystal material 140 with the smooth surface 112. This alignment layer is typically applied with spin coating, spraying, dip coating, inkjet printing, or another suitable method. The alignment layer is also rubbed with a felt cloth, exposed to polarized light, or heated to introduce a pre-tilt angle to the alignment layer. An example alignment layer material is Sunever made by Nissan Chemicals in Japan.

Figure 1B:
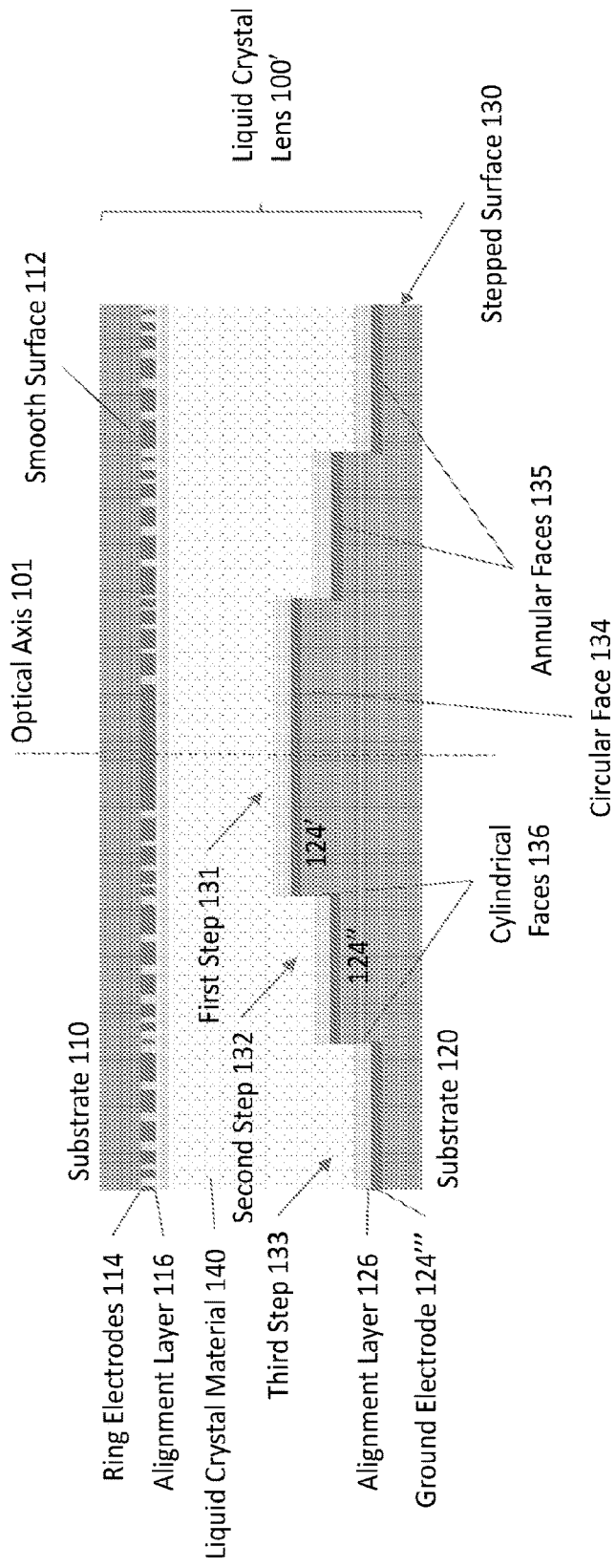
FIG. 1B shows a cross-sectional view of a liquid crystal lens with separate ground plane electrodes on a stepped surface opposite ring electrodes on an even planar surface.

FIG. 1B shows a modified version 100' of the liquid crystal lens 100 in FIG. 1A. In this modified liquid crystal lens 100', there are separate electrodes 124', 124", and 124'" on the circular face 134 and annular faces 135 of the stepped surface 122. The electrodes 124', 124", and 124'" can be coated with an insulating layer (not shown) and connected to respective voltage supplies via buss lines (conductive traces; not shown) formed on the insulating layer. These electrodes 124', 124", and 124''' are not directly connected to each other—they do not extend over the cylindrical faces 136 of the stepped surface—and so can be kept at different voltage potentials. For example, these potentials can be selected to account for the variation in thickness of the liquid crystal material 140, such that there is a larger potential drop across the thicker regions of liquid crystal material 140. This may allow a reduction in the maximum voltage applied to the ring electrodes 114 for actuating the liquid crystal 100'. Alternatively, the electrodes 124', 124", and 124''' can be connected to a common ground via the buss lines so that they are at the same potential. The voltage for achieving the desired change in birefringence and optical path difference (OPD) as a function of liquid crystal material and thicknesses is disclosed in Wu et al., "Birefringence Measurements of Liquid-Crystals," Applied Optics 23(21): 3911-3915, December 1984, DOI: 10.1364/AO.23.003911. For example, the driving voltage may be increased by 0.2 volts to achieve the same OPD for an increase in the thickness of the liquid crystal from 15 μm to 25 μm.

Figure 2A:
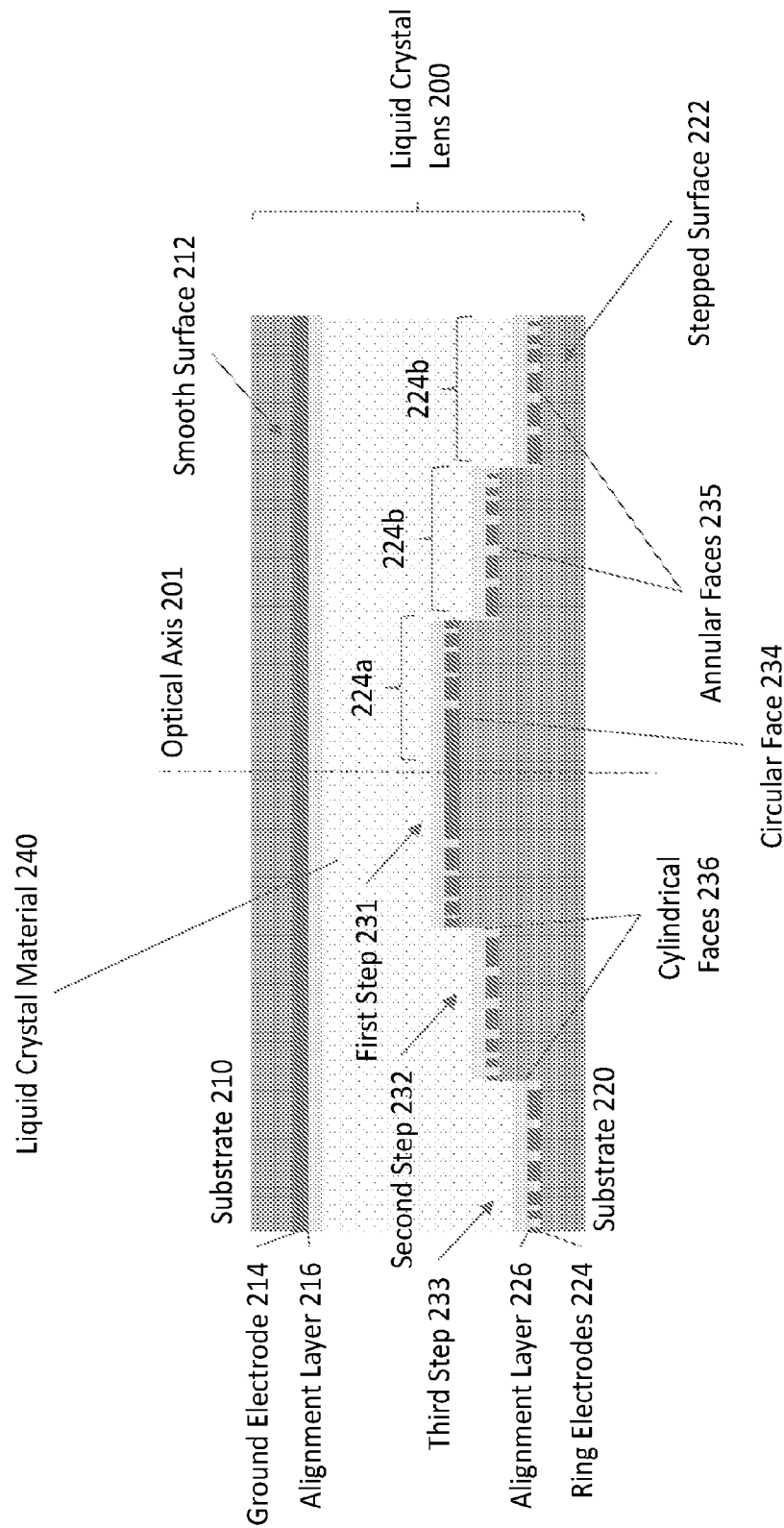
FIG. 2A shows a cross-sectional view of a liquid crystal lens with ring electrodes on a stepped surface opposite a ground plane electrode on an even planar surface.
Figure 2B:
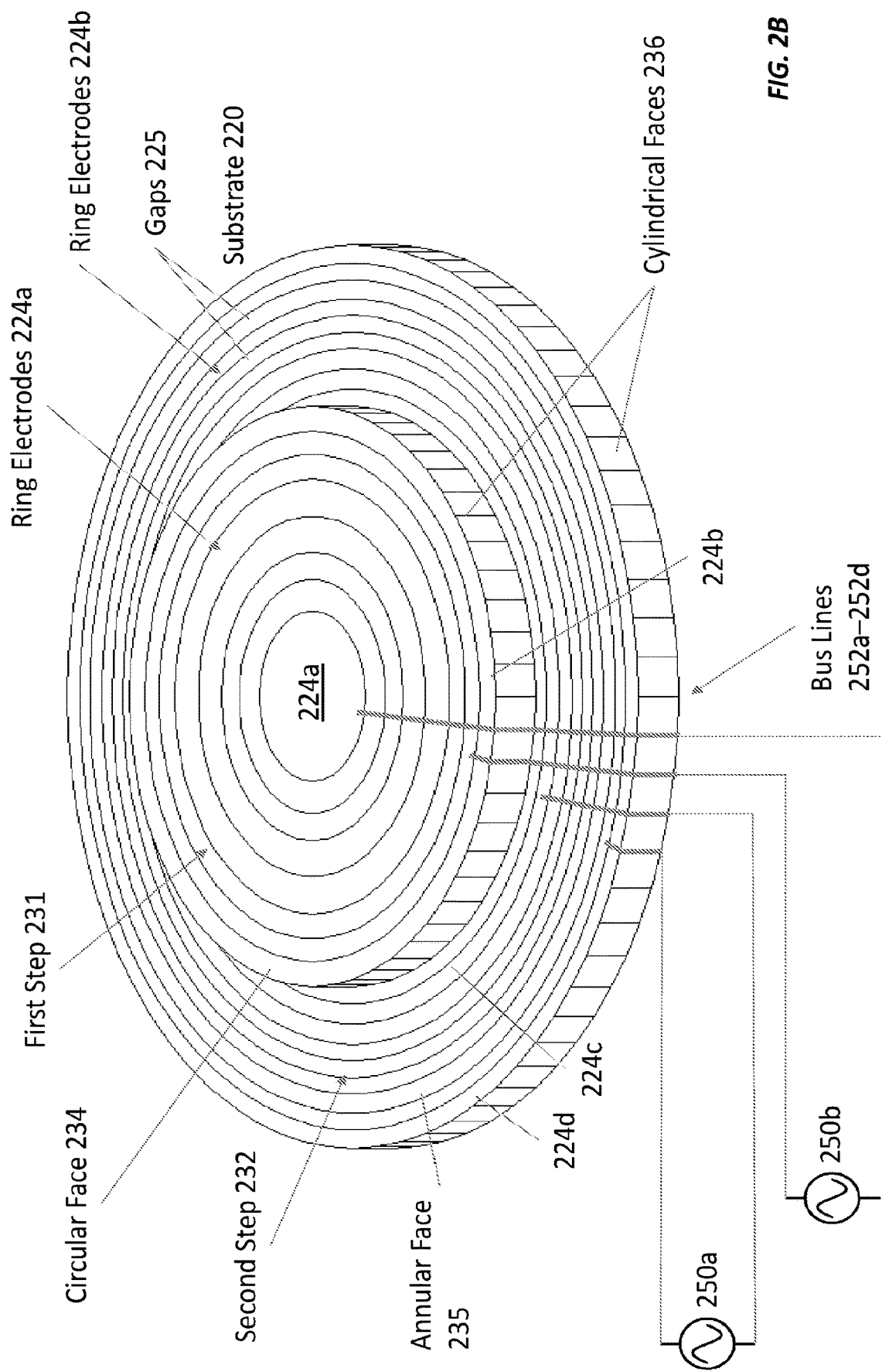
FIG. 2B shows a perspective view of some of the ring electrodes and a portion of the stepped surface in the liquid crystal lens of FIG. 2A.

FIGS. 2A and 2B illustrate an inventive liquid crystal lens 200 with ring electrodes 224 formed on a stepped surface 222 of a transparent substrate 220. FIG. 2A shows a cross section of the liquid crystal lens 200, and FIG. 2B shows a perspective view of a portion of the stepped surface 222 and some of the ring electrodes 224. The transparent substrate 220 and another transparent substrate 210 with a smooth (here, planar) surface 212 with liquid crystal material 240 between the smooth surface 212 and the stepped surface 222. The smooth surface 212 is coated with a transparent conductive material, such as ITO, that forms a ground plane electrode 214, which in turn is coated with a liquid crystal alignment layer 216.

The ring electrodes 224 are formed of conductive traces deposited directly on the stepped surface's circular face 234 and annular faces 235, which are connected by cylindrical faces 236 and concentric with the lens's optical axis 201. The faces define steps 231-233 that set regions of increasing liquid crystal thickness moving radially outward from the lens's optical axis 201. There are at least two ring electrodes 224 on the circular face 234 and on each annular face 235, providing respective subsets 224a-224c of ring electrodes for the steps 231-233 and regions of liquid crystal material 240. The ring electrodes 224 in each of subset 224a-224c can be connected to each with resistive bridges as described below.

The outer ring electrodes 224 on each face/step are narrower than the inner ring electrodes 224 on that face/step. And the innermost ring electrode 224 on each face step is wider that the outermost ring electrode 224 on the next higher step. In FIG. 2A, the outermost ring electrode 224 on the first step 231 (first subset 224a) is narrower than the innermost ring electrode 224 on the second step 233 (second subset 224b), and the outermost ring electrode 224 on the second step 233 is narrower than the innermost ring electrode 224 on the third step 233 (third subset 224c).

FIG. 2B shows how the ring electrodes 224 are connected to voltage supplies 250a and 250b with voltage supply connections or buss lines 252a-252d (collectively, buss lines 252). (The third step 233 is omitted for clarity.) The buss lines 252 are formed of conductive material, such as ITO or nickel, that is deposited on an insulating layer (not shown) that covers the ring electrodes 224. The insulating layer fills gaps 225 that separate and electrically isolate the ring electrodes 224 from each other. The gaps 225 are each about the same width (e.g., about 3 microns). This insulating layer can optionally extend over the cylindrical faces 236 of the stepped surface 222.

Each buss line 252 traverses at least a portion of the insulating layer and stepped surface 222 to a corresponding ring electrode 224 and connects to that ring electrode 224 through a corresponding hole or via in the insulating layer. Buss line 252a traverses the annular faces 235, cylindrical surfaces 236, and a portion of the circular face 234 to the innermost (center) ring electrode 224. Buss line 252b traverses the annular faces 235, cylindrical surfaces 236, and a portion of the circular face 234 to the outermost ring electrode 224 in the first subset 224a of ring electrodes. Together, buss lines 252a and 252b connect the first subset 224a of ring electrodes 224 to a first voltage supply 250a, which drives the first subset 224a of ring electrodes 224 with a first voltage. Similarly, buss lines 252c and 252c traverse the annular faces 235 and outer cylindrical face 236 to connect the innermost and outermost electrodes, respectively, of the second subset 224b of ring electrodes 224 to a second voltage supply 250b, which drives the second subset 224b of ring electrodes 224 with a second voltage, which may be higher to achieve the same OPD due to its increased thickness. Some liquid crystals have such a high response rate to voltage, that no increase may be required to compensate for the increased thickness.

Figure 2C:
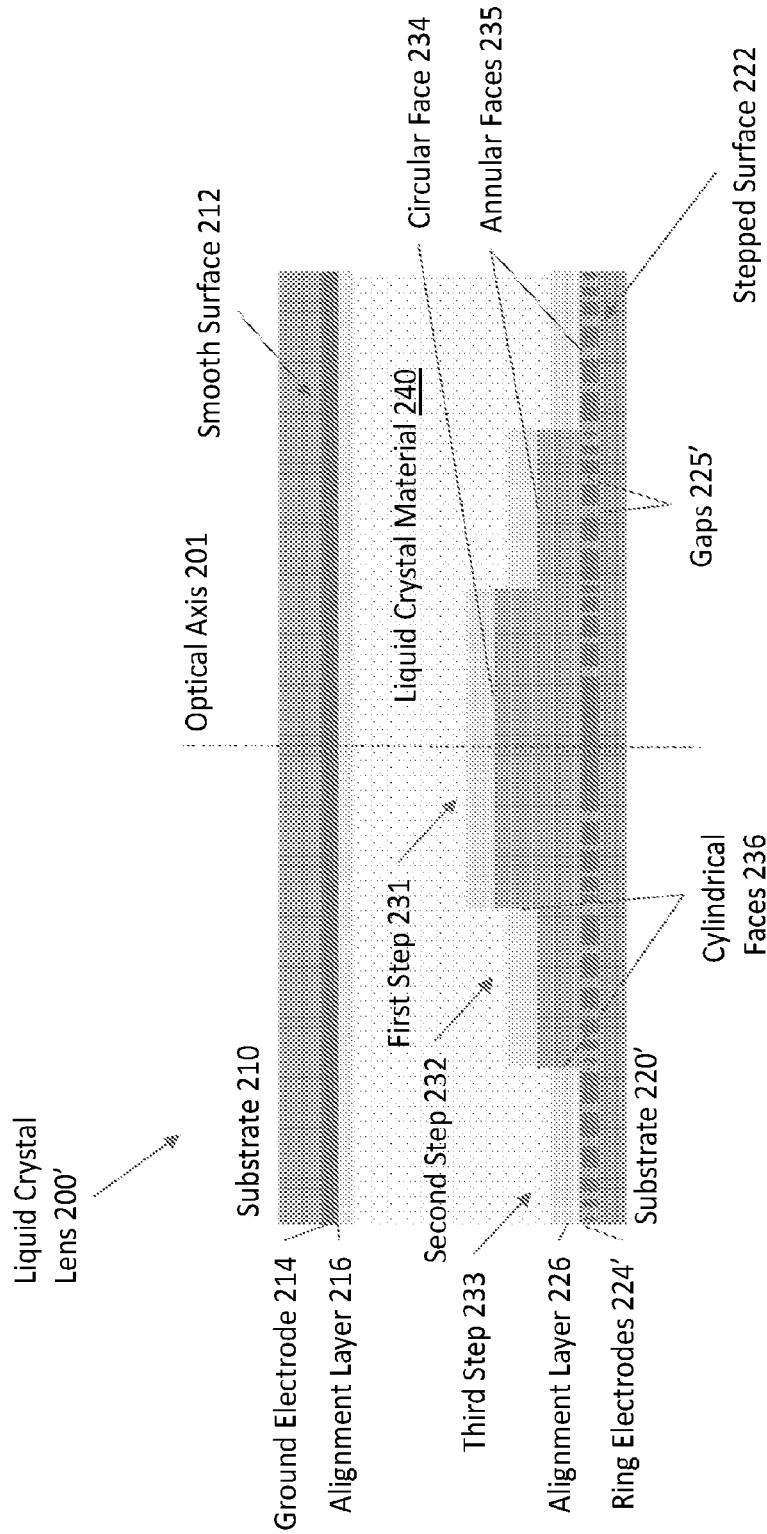
FIG. 2C shows a cross-sectional view of a liquid crystal lens with ring electrodes under a stepped surface opposite a ground plane electrode on an even planar surface.

FIG. 2C shows a modified version 200' of the liquid crystal lens 200 in FIGS. 2A and 2B. In this modified liquid crystal lens 200', the ring electrodes 224' are formed under the stepped surface 222' instead of on the stepped surface 222. For example, the ring electrodes 224', resistive bridges, insulating layer, and buss lines can be formed on a flat substrate surface. Once these elements have been formed, additional transparent material, such as resin or photoresist, can be deposited (and optionally patterned) to form the stepped surface 222' on top of the ring electrodes 224'. When positioning the electrodes under the stepped surface, the voltage must be adjusted upward, as described above. There are still gaps 225' between adjacent electrodes 224', but those gaps are covered by this extra (insulating) material. The stepped surface 222' is formed such that there are multiple ring electrodes per step. When viewed along the lens's optical axis 201, the ring electrodes 224' form a pattern similar to or the same as the patterns used in the liquid crystal lenses 100 and 200 shown in FIGS. 1A and 2A.

Figure 3:
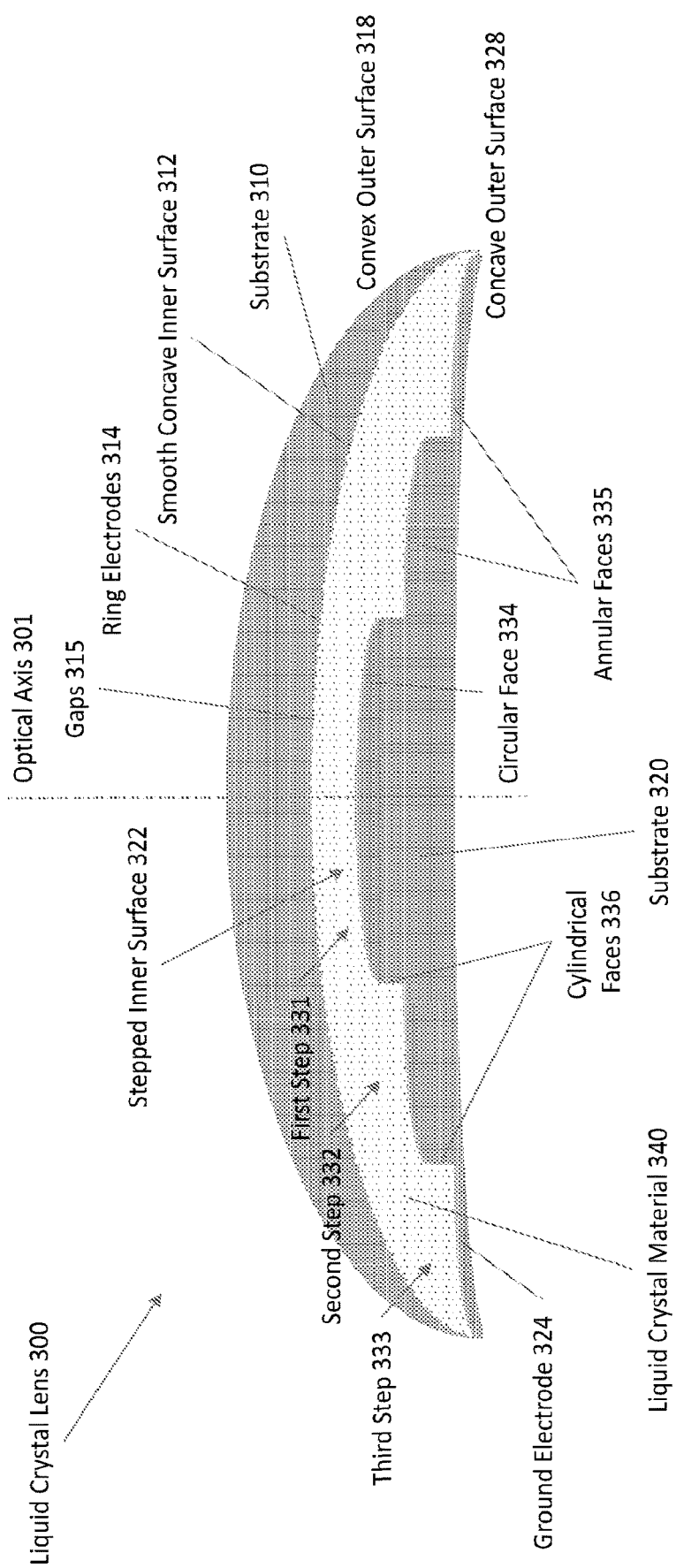
FIG. 3 shows a cross-sectional view of a liquid crystal lens with a single ground plane electrode on a curved, stepped surface opposite ring electrodes on an even, curved surface.

FIG. 3 shows a cross-section of an inventive liquid crystal lens 300 with liquid crystal material 340 sealed between curved transparent substrates 310 and 320. This liquid crystal lens 300 is a convex-concave lens with a convex outer surface 318 and a concave outer surface 328. With this shape, the lens 300 is suitable for use as a contact lens or spectacle lens when made of the appropriate materials and with the appropriate dimensions. An inventive liquid crystal lens can also have two convex outer surfaces, e.g., for use as an intraocular lens, or two concave outer surfaces. In any event, the outer surfaces can be spherical sections or more complicated shapes, include aspheric shapes, to provide a fixed optical power for the lens. The outer surfaces can also be shaped to correct aberration (e.g., astigmatism of a patient's eye) or to provide multiple focal lengths as in bifocal, trifocal, or progressive lenses.

The inner surfaces of the substrates 310 and 320 are also curved. In this case, the upper substrate 310 has a smooth concave inner surface 312, and the lower substrate has a convex stepped inner surface 322. Together, inner surfaces form a sealed cavity that holds the liquid crystal material 340. The upper substrate's inner surface can be planar, convex, or have a more sophisticated shape, depending on the desired switchable optical properties of the lens 300. Likewise, the stepped inner surface 322 can have planar steps like those shown in FIGS. 1A, 1B, and 2A-2C or steps that are angle or concave, again depending on the desired switchable optical properties of the lens 300. In this example, the stepped surface 322 forms three steps 331-333, which, when viewed along the lens's optical axis 301, formed faces that appear circular (334) and annular (335), but are slightly curved (convex). Each of these faces can be contiguous with its neighboring faces or contiguous with intervening cylindrical faces 336.

Figure 4:
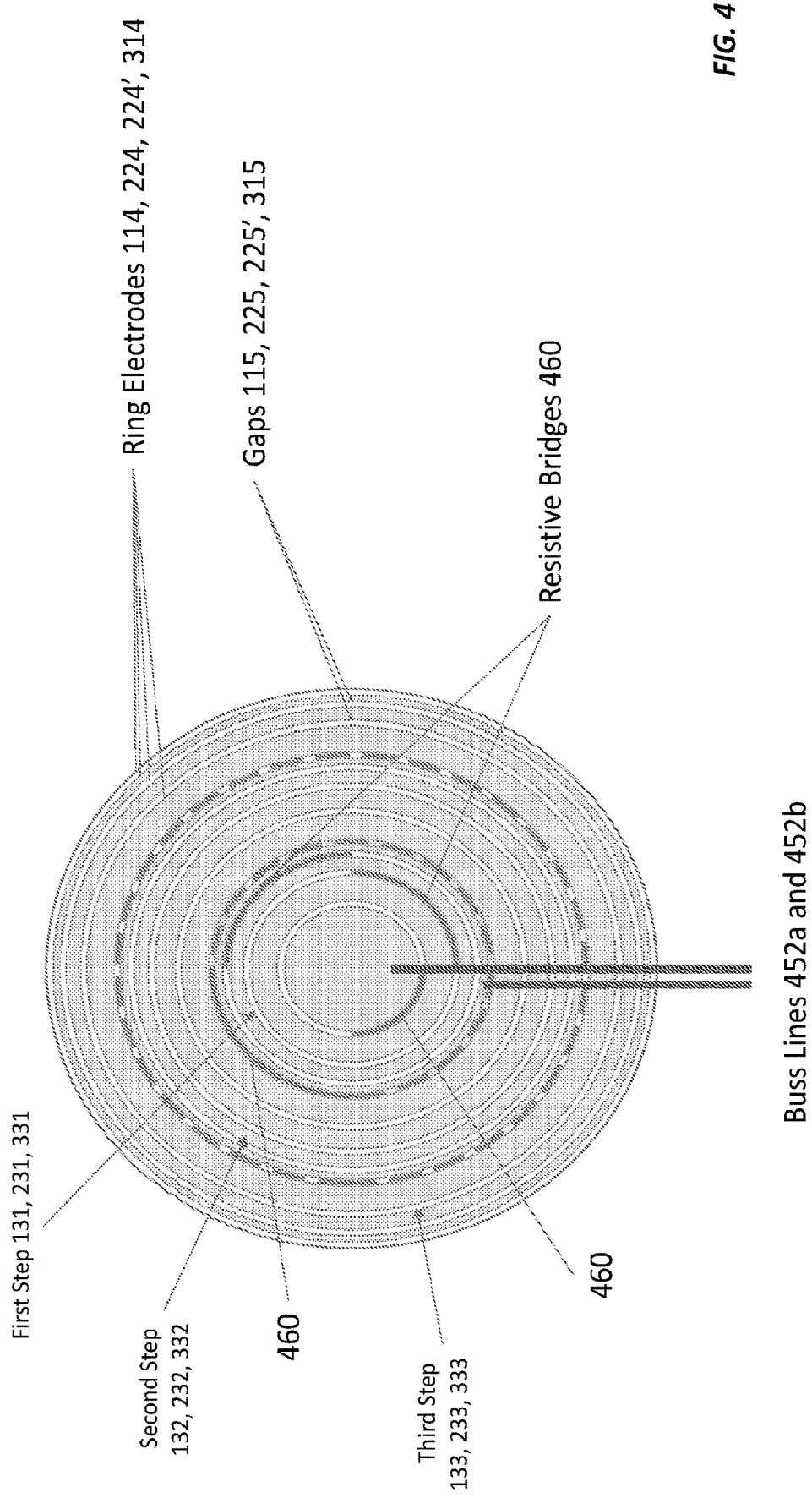
FIG. 4 shows a plan view of ring electrodes, resistive bridges (arcs), buss lines, and steps of a stepped surface as in the lenses shown in FIGS. 1-4.

A conductive layer on the stepped surface 322 forms a ground plane electrode 324. The lens 300 also include ring electrodes 312 on the concave inner surface 312 of the upper substrate 310. These ring electrodes 314 are separated by gaps 315 and have widths that decrease and increase in alignment with the steps as shown in FIG. 4 (described below). The ring electrodes 314 and gaps 315 may be covered with an insulating layer (not shown). Buss lines and/or resistive bridges (not shown) connect ring electrodes 314 to a controller or other voltage supply or set of voltage supplies. Alternatively, the ring electrodes can be on or under the stepped surface 322, with the ground plane on the concave inner surface 312 of the upper substrate as in FIGS. 2A-2C.

Example Design Process for Multi-Depth Liquid Crystal Lenses

When designing the electrode structures for a liquid crystal lens, several factors should be considered. These factors include: (1) the diameter of the lens; (2) the thickness of the central region of the liquid crystal layer (the thinnest portion of the liquid crystal layer); (3) the available birefringence (refractive index change) of the liquid crystal; (4) the minimum allowable width of the electrodes (typically set by the lithographic process used to make the electrodes); (5) the minimum number of electrodes desired in the lens; (6) the total available Optical Path Difference (OPD); and (7) the design wavelength of the lens.

Consider the following example design process for a lens with a desired diameter of 30 mm, the starting thickness of liquid crystal is 10 microns (0.010 mm), the available birefringence (refractive index change) of the liquid crystal is 0.22 (e.g., from 1.5 to 1.72), the minimum allowable electrode width is 500 microns, and the minimum number of electrodes in the lens is 15. More than the minimum number of electrodes is desired, but less than the minimum number is not desired. The design wavelength is 550 nm (green).

In this example, the first step is to establish the widths of a set of electrodes rings using the same process used in designing a liquid crystal lens without a stepped surface. Although the desired minimum number of electrodes is 15, calculating the widths of 15 electrodes shows that that the outermost electrodes do not meet the minimum desired width. By increasing the number of electrodes to 20, at least the eleven inner electrodes meet the desired minimum width. The liquid crystal thickness and widths and number of the outer electrodes can be adjusted to compensate as described below. Each electrode should have a surface area that is the same as all the other electrodes. This is calculated by determining the entire surface area of the lens and dividing by the number of electrodes desired. In this example, the entire surface of a 30 mm diameter lens is 706.86 mm². When this value is divided by 20, each electrode should have a surface area of 35.343 mm². (The gaps between electrodes are small enough to be neglected at this stage of the design process.)

The outer diameter of outermost ring electrode is set to the desired lens diameter, which is 30 mm in this case. The outermost ring electrode's inner diameter is calculated by subtracting its desired surface area from the total lens surface area, then the dividing by 7 and taking the square root of the quotient to get the outermost ring electrode's inner radius. Doubling this radius gives the inside diameter of the outermost ring electrode. In this example, a total surface area of 706.86 square millimeters, minus the desired area of a single electrode of 35.343 mm², results in a surface area within the outer electrode of 671.52 mm², which corresponds to an inner radius of 14.62 mm and an inner diameter of 29.24 mm. This process is repeated until all the electrodes are calculated, with the inner diameter each ring electrode less the gap between electrodes serving as the outer diameter of next inner ring electrode. (If desired, the innermost electrode can be circular.)

Table 1 shows the results of these calculations, with ring electrode no. 1 being the innermost electrode and ring electrode no. 20 being the outermost electrode. Table 1 shows only the central eleven electrodes (electrode nos. 1-11) meet the minimum width requirement of 0.5 mm, and the remaining nine (electrode nos. 12-20) do not.

TABLE 1

Starting Ring Electrode Widths (Conventional Liquid Crystal Lens)

| Electrode No. | Area of Circle with Outer Radius (mm²) | Outer Radius (mm) | Electrode Width (mm) | Notes |
|---|---|---|---|---|
| 1 | 35.34 | 3.35 | 3.35 | Innermost |
| 2 | 70.69 | 4.74 | 1.39 | |
| 3 | 106.03 | 5.81 | 1.07 | |
| 4 | 141.37 | 6.71 | 0.9 | |
| 5 | 176.71 | 7.5 | 0.79 | |
| 6 | 212.06 | 8.22 | 0.72 | |
| 7 | 247.4 | 8.87 | 0.66 | |
| 8 | 282.74 | 9.49 | 0.61 | |
| 9 | 318.09 | 10.06 | 0.58 | |
| 10 | 353.43 | 10.61 | 0.54 | |
| 11 | 388.77 | 11.12 | 0.52 | |
| 12 | 424.11 | 11.62 | 0.49 | Below design width of 0.5 mm |
| 13 | 459.46 | 12.09 | 0.47 | Below design width of 0.5 mm |
| 14 | 494.8 | 12.55 | 0.46 | Below design width of 0.5 mm |
| 15 | 530.14 | 12.99 | 0.44 | Below design width of 0.5 mm |
| 16 | 565.49 | 13.42 | 0.43 | Below design width of 0.5 mm |
| 17 | 600.83 | 13.83 | 0.41 | Below design width of 0.5 mm |
| 18 | 636.17 | 14.23 | 0.4 | Below design width of 0.5 mm |
| 19 | 671.52 | 14.62 | 0.39 | Below design width of 0.5 mm |
| 20 | 706.86 | 15 | 0.38 | Outermost |

The first part of the solution to this design problem of making every electrode at least 0.5 mm wide is to make electrode no. 12 wider, then restart the electrode design calculations so that electrodes no. 13+ have the same area as the wider electrode no. 12. Before doing this though, we should account for the available OPD to ensure that the ratio of electrodes to OPD is sufficient to provide the desired optical power and wavefront smoothness.

The available OPD of this design is calculated by multiplying the liquid crystal layer thickness times its available birefringence, then dividing by the design wavelength. In this case, the central 10-micron thickness times the available birefringence of 0.22 gives 2.2 microns of light retardation. Dividing the 2.2 microns of retardation by the design wavelength of 550 nm (green light) shows that there are four waves of OPD available. But there is insufficient OPD to provide the desired optical power with the desired wavefront smoothness by simply increasing the width of electrodes nos. 12-20. The optical power may be achieved, but the wavefront will be quite coarse in a stair-step fashion.

The second part of the solution to this design problem is to increase the available OPD. This is accomplished by increasing the thickness of the liquid crystal layer at radii greater than the outer radius of electrode no. 11, then repeating the electrode design process outlined above, but this time starting with the inside diameter of electrode no. 12, which is the outside diameter of electrode no. 11 in Table 1. In other words, create a second step or tier with the electrodes that have radii greater than the outer radius of electrode no. 11, with the electrodes on the second step having widths of 0.5 mm or more.

To meet the design goal of at least 15 electrodes, the area of each electrode on the second step is set to by dividing the area of the second step by four (15 electrodes total minus the 11 inner electrodes on the first/central step). This calculation results in each of the four electrodes having an area of 79.53 mm². Table 2 shows the widths and radii of the four electrodes on the second step along with the radii and widths of ring electrode no. 11 (the outermost electrode on the first step) and of the first electrode to have a radius greater than the desired lens radius:

TABLE 2

Ring Electrode Radii and Widths for Second Step

| Electrode No. | Area | Outer Radius (mm) | Electrode Width (mm) | Notes |
|---|---|---|---|---|
| 11 | 388.77 | 11.12 | 0.52 | First Step |
| 12 | 468.29 | 12.21 | 1.08 | Second Step |
| 13 | 547.81 | 13.21 | 1.00 | |
| 14 | 627.34 | 14.13 | 0.93 | |
| 15 | 706.86 | 15.00 | 0.87 | Outermost |
| 16 | 786.38 | 15.82 | 0.82 | Exceeds Lens Radius |

Table 3 shows the finalized electrode radii and widths for the stepped lens, with electrode number 1 being the innermost (center) electrode and electrode number 15 being the outermost electrode:

TABLE 3

Final Ring Electrode Widths

| Electrode No. | Outer Radius (mm) | Electrode Width (mm) | Notes |
|---|---|---|---|
| 1 | 3.35 | 3.35 | Innermost |
| 2 | 4.74 | 1.39 | |
| 3 | 5.81 | 1.07 | |
| 4 | 6.71 | 0.9 | |
| 5 | 7.5 | 0.79 | |
| 6 | 8.22 | 0.72 | |
| 7 | 8.87 | 0.66 | |
| 8 | 9.49 | 0.61 | |
| 9 | 10.06 | 0.58 | |
| 10 | 10.61 | 0.54 | |
| 11 | 11.12 | 0.52 | First Step |
| 12 | 12.21 | 1.08 | Second Step |
| 13 | 13.21 | 1 | |
| 14 | 14.13 | 0.93 | |
| 15 | 15 | 0.87 | Outermost |

Then we determine the increase of the liquid crystal layer thickness above the second step by calculating the increase in the width of the first thickened electrode from the previous thinner electrode and increasing the liquid crystal layer thickness proportionally. In this example the increase of thickness is a factor of 2.08, which translates to an increase in OPD (and step height) of 10.8 microns, for a new total thickness of 20.8 microns.

In other lenses, the number of electrodes may be much larger, e.g., 100, 200, 300 or more in a 30 mm diameter lens. Each step could be one or more wavelengths of light higher than the next outer step. Lower increases would result in more steps, and larger increases could result in fewer steps. For example, a 30 mm lens that had a starting OPD of 3 waves, and each increase was one wave, the lens would have five steps. If each increase is 3 waves, the lens would have two steps. The above example uses 15 electrodes to illustrate the design method with a smaller, more easily read set of numerical values. This resulted in the thickness of the liquid crystal layer being increased by a non-integer amount (a factor 0f 2.08). Alternatively, the increase in OPD/step height can be done in integer multiples of the design wavelength to increase the diffraction efficiency. If setting the step height to integer multiples of the design wavelength, the lens diameter may not be exactly the value desired, but with a larger number of electrodes, for example, 300 electrodes in a 30 mm diameter lens, the differences become negligible and the target 30 mm diameter may be missed by only a few tens of microns.

The final design step is to adjust the inner and outer radii of the electrodes to provide for a gap between them to eliminate electrical contact between electrodes. Each electrode may be powered by a voltage that is different than the voltage applied to an adjacent electrode, so the gaps prevent electrical short-circuiting. A typical gap width is 3 microns, so the radius of values of each electrode are adjusted by 1.5 micron (i.e., the inside radius is increased by 1.5 micron and the outside radius decreased by 1.5 micron). Although the typical gap today is currently 3 microns, as lithography technology improves this gap may be reduced.

Although there are typically 300 electrodes in a 30 mm diameter lens, this number is also a result of lithography technology limitations. Generally, more electrodes are better because the stair steps of the wavefront will be much smaller. As lithography technology evolves, the number electrodes can be increased from hundreds to thousands, or more.

Example voltages applied to the example lens design are as follows:

TABLE 4

Ring Electrode Voltages

| Electrode No. | Volts |
|---|---|
| 1 | 1.87 |
| 2 | 1.66 |
| 3 | 1.51 |
| 4 | 1.36 |
| 5 | 1.23 |
| 6 | 1.11 |
| 7 | 1.00 |
| 8 | 0.94 |
| 9 | 0.86 |
| 10 | 0.81 |
| 11 | 0.75 |
| 12 | 0.71 |
| 13 | 0.66 |
| 14 | 0.62 |
| 15 | 0.57 |

Ring Electrodes and Resistive Bridges

FIG. 4 shows a pattern that can be formed by the ring electrodes 114, 224, 224', and 314 and gaps 115, 225, 225', and 315 in the lenses shown in FIGS. 1A, 2A, and 2C and described above when viewed along the lenses' optical axes 101, 201, and 301. Dashed lines represent the boundaries or transitions between the first steps 131, 231, and 331 and the second steps 132, 232, and 332 and between the second steps 132, 232, and 332 and the third steps 133, 233, and 333. In this pattern, there are four ring electrodes per step and three steps total. Other suitable patterns may have more or fewer steps and/or more or fewer ring electrodes per step. Generally, more ring electrodes provide finer control of the lens's focal length and better spatial resolution. And more steps enable lenses of larger diameters. In today's state of the art of lithography, a reasonable range of electrodes per step is between 30 and 100, with one, two, three, four, or five steps per lens. As lithography technology evolves, these numbers may increase.

The ring electrode widths vary with radius and step number, but the gaps are all about the same width. The gap width may be set to the minimum width (e.g., about 3, 4, or 5 microns) that provides the desired electrical isolation between neighboring ring electrodes and can be patterned, e.g., using lithography or other techniques. With today's state of the art of lithography liquid crystal birefringence, the range of ring electrode widths can vary between 5 mm and 15 while the step height can range between 1 μm and 30 μm.

FIG. 4 also shows two buss lines 452a and 452b (collectively, buss lines 452) that connect the innermost and outermost ring electrodes, respectively, on the first step to a voltage supply terminals on a controller or voltage supply. Other buss lines (omitted for clarity) connect at least the innermost and outermost ring electrodes on the other steps to other voltage supply terminals on the controller or other voltage supplies. For lenses with more ring electrodes per step, additional buss lines may connect to intermediate ring electrodes as well. As described above, these buss lines 452 are on a transparent insulating layer (not shown) that is on top of the ring electrodes and that fills the gaps between the ring electrodes. Each buss line 452 connects to the corresponding ring electrode through a hole or via in the insulating layer.

Resistive arcs or curved resistive bridges 460 connect the ring electrodes on each step. The resistive bridges 460 act as a voltage divider network connected the innermost ring electrode on each step to the outermost ring electrode on each step. The voltage applied by the buss lines 452 drops across the resistive bridges 460 in proportion to their resistances, producing a voltage gradient across the ring electrodes. This voltage gradient produces a corresponding refractive index gradient in the liquid crystal material, giving the lens its optical power.

Each resistive arc 460 can be formed as a thin, curved strip of resistive material, for example ITO, carbon nanotubes, silver nanowires, or similar materials that are electrically conductive and optically transmissive, that connects a point on the outer edge of an inner ring electrode with a point on the inner edge of an outer ring electrode across the gap between the inner and outer ring electrodes. These points can be separated from each other azimuthally (i.e., in cylindrical coordinates with the lens's optical axis coincident with the cylindrical z axis, the resistive arc's ends (termini) may have different angular coordinates 0). This angular separation may range from a few degrees (e.g., 1°, 5°, or 10°) to 360° or more, corresponding to a resistive arc that follows a spiral path between electrodes. These resistive arcs are called "spiralesque" resistive arcs. In FIG. 4, the resistive arcs 460 subtend angles of 90° each. The resistive arcs 460 are evenly distributed in angular, but other subtended angles and angular distributions are possible.

A resistive arc's arc length depends on the angular separation between its ends and the radii of the electrodes. Generally, a resistive arc 460 can span any specified length from 1 micron to 10 cm. Several resistive arcs, each having a different average radius, can be connected in series by short lengths of the same resistive arc material. These short lengths can be oriented at nearly any desired rotational angle. The resulting spiralesque resistive arc may span one or more (e.g., two, five, or ten) rotations around the inner electrode to provide higher resistance (and lower power dissipation). In general, everything else being equal, the greater the length of a spiralesque resistive arc, for a given arc width, the higher its effective resistance. In other words, a high ratio of length to width for a resistive arc produces a higher resistance.

For a spiralesque resistive arc comprising a single rotation about the inner radius of the electrode, the limiting factor on its length is the circumference of the electrode, which can be several orders of magnitude larger than the width of the arc (that is, the co-planar dimension that is perpendicular to the length and/or direction of the arc at any given point along the arc). This length can be further increased by the facilitation of resistive arcs consisting of subsequent further rotations (and/or a partial rotation) around the inner radius of the electrode. The maximum length is defined by both the number of rotations, which is restricted by the width and circumference of the electrode.

The gap between electrodes can be approximately 1.5 microns wide, yet the range of gap and/or resistive arc widths can be between 0.1 microns to 10 microns, including any and every value and sub-range therebetween (such as 0.242, 0.50, 0.7673, 1.0, 1.22, and 1.43 microns). The electrodes, gaps, and/or resistive arcs can be formed via, for example, lithography, etching, printing (e.g., of conductive polymers), self-assembly, lift-off, laser ablation, and/or any other method of thin film patterning. When lithography is used, it can involve proximity lithography, contact lithography, projection lithography, interference lithography, mask-less lithography, electron-beam lithography, and/or another other lithographic techniques. When etching is used, it can involve wet (liquid based) etching and/or dry (plasma based) etching.

The resistance of each resistive arc can be equal between each electrode connected. This can be achieved by selecting the lengths of the resistive arcs to be the same or nearly the same (e.g., 50 microns each), rather than preserving angular size (e.g., in contrast to the example shown in FIG. 4, where a 90-degree segment is used for each connection). Setting the resistive arcs to be of uniform length ensures that uniform resistance between the electrodes.

The spiralesque nature of a spiralesque resistive arc can minimize the distortion to the wavefront by the lens. The voltage in a spiralesque resistive arc region along the length (direction of travel) of the arc can vary between the voltage of the two connected electrodes. Therefore, the refractive index in the arc region can vary between the refractive index of each of the two electrode regions being connected by the arc, and hence can cause minimal disruption to the wavefront profile. The etched regions of the conductive material forming the arc can experience fringing fields from the electrodes and/or the resistive arc, which can minimize disruption.

Figure 5B:
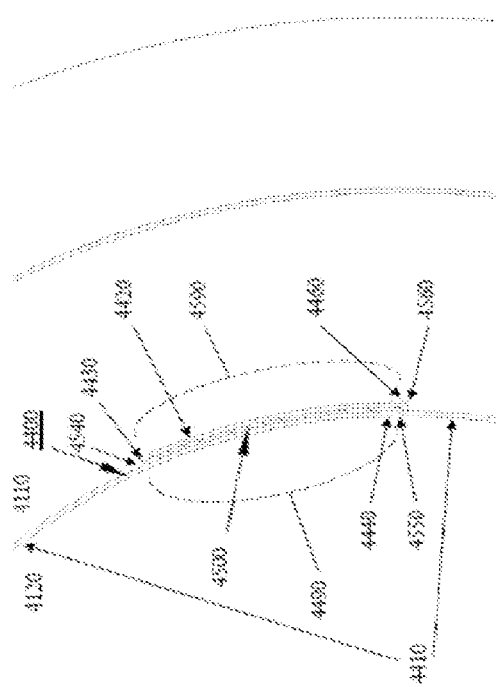
FIGS. 5A and 5B illustrate ring electrodes and resistive bridges suitable for use in an inventive liquid crystal lens.
Figure 5A:
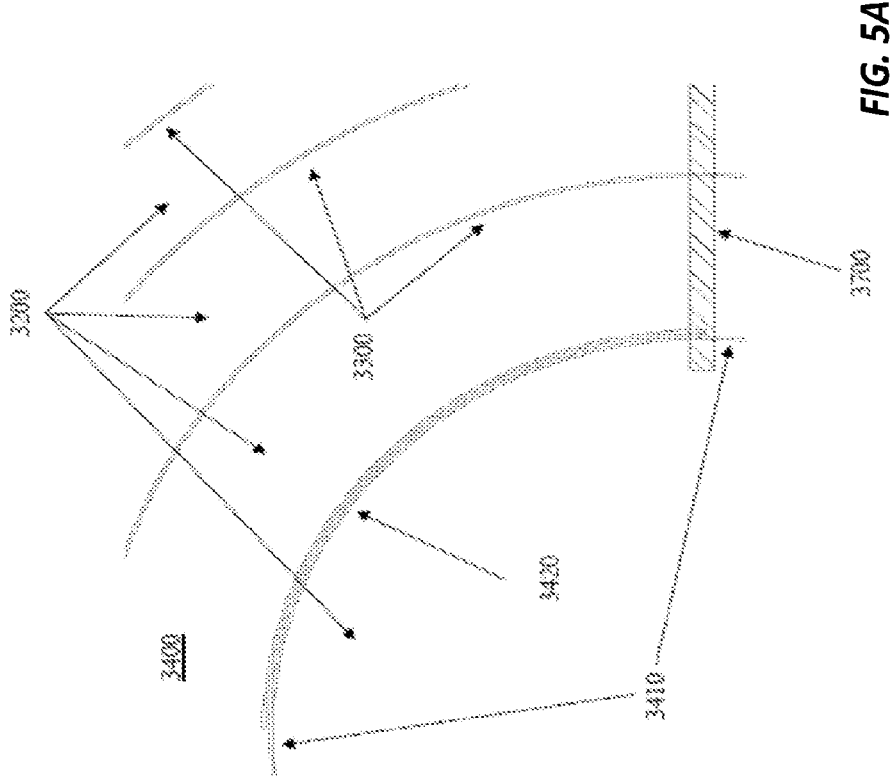

FIG. 5A is a view, looking along the optical axis, showing (what appear to be at this level of magnification) a plurality of ring-like electrodes 3200 suitable for use in a liquid crystal lens with a stepped or tiered interior substrate surface. The ring-like electrodes 3200 are substantially separated by (what appear to be at this level of magnification) a plurality of substantially ring-like non-conductive gaps 3300. In addition, FIG. 5A illustrates a voltage supply connection (buss line) 3700 and a spiralesque gap 3400 that has a non-overlapping portion 3410 (partially visible in this view) and an overlapping portion 3420. The voltage supply connection 3700 connects an inner electrode 3200 to a voltage supply (not shown).

FIG. 5B is a close up of a pair of electrically conductive and/or resistive neighboring electrodes 4110 and 4120 suitable for use actuating liquid crystal above one step in an inventive liquid crystal lens. The electrodes 4110 and 4120 are substantially separated by gap 4400, which defines a single-gap non-overlapping portion 4410 and a dual-gap overlapping portion 4420. Gap 4400 can be visualized as starting at beginning terminus 4430 and finishing at ending terminus 4440 and having an abrupt change in radius at location 4450. Overlapping portion 4420 defines a (curved) overlap length 4490.

Between the dual gaps of overlapping portion 4420 is a spiralesque arc 4500 having a (curved) arc length 4590. Arc 4500 can be formed from the same material as neighboring electrodes 4110 and 4120, and thus can provide a conductive and/or resistive link between those electrodes that can allow a current to flow from electrode 4110, through arc entry 4540, along the length 4590 of arc 4500, around arc corner 4560, and out arc exit 4550 to electrode 4120 and/or in the reverse direction. The longer the curved length 4490, the longer the arc length 4590, and thus the larger the electrical resistance provided by spiralesque arc 4500. Likewise, the closer the dual gaps of overlapping portion 4420, the narrower arc 4500, and the larger the electrical resistance provided by spiralesque arc 4500. The change in radius of gap 4400 as it transitions from non-overlapping portion 4410 to overlapping portion 4420 can be abrupt, as shown at gap corner 4460, or more gradual, potentially occurring over any desired part (and up to the entire length) of non-overlapping portion 4410. Likewise, arc 4500 can have a substantially constant radius and/or can have disruptions and/or discontinuities, such as shown at arc corner 4560.

Figures 6A, 6B:
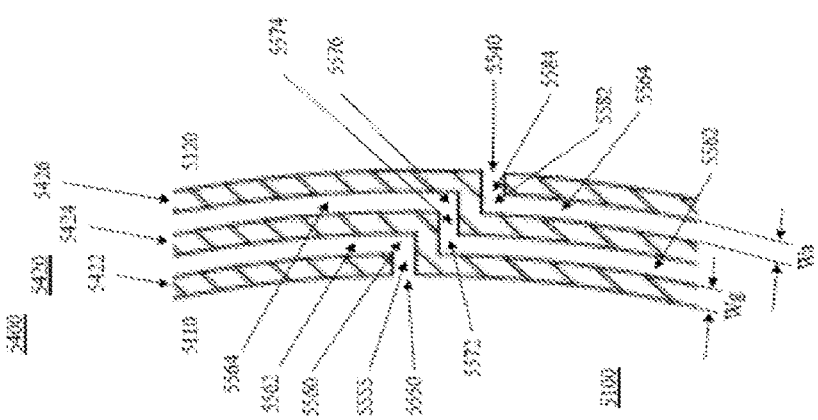
FIGS. 6A and 6B illustrate ring electrodes and spiralesque resistive bridges suitable for use in an inventive liquid crystal lens.

FIG. 6A is a view, looking along the optical axis, at electrodes 5110 and 5120 suitable for use in an inventive liquid crystal lens. These electrodes 5110 and 5120 are substantially separated by (what appear to be at this level of magnification) a spiralesque gap 5400 having an overlapping portion that spans several revolutions.

FIG. 6B is a close-up of zone B of FIG. 6A. It shows neighboring electrodes 5110 and 5120 substantially separated by a spiralesque gap 5400 having an overlapping portion 5420 that spans several revolutions. This structure appears to comprise three gap rings 5422, 5424, and 5426. The geometry of overlapping portion 5420 of gap 5400 substantially defines the geometry of spiralesque arc 5500, at least in the plane perpendicular to the optical axis. The geometry of spiralesque arc 5500 in the direction of the optical axis can be controlled by the depth of electrode layer 5100. In this example, given the geometry of spiralesque arc 5500, current can flow from electrode 5110, through arc entrance 5550, along first radial portion 5555, around first corner 5560, along first arc portion 5562, around second corner 5572, along second radial portion 5574, around third corner 5576, along second arc portion 5564, around fourth corner 5582, along third radial portion 5584, and out arc exit 5540 to electrode 5120. The gap width Wg can be constant or can vary along gap 5400. Likewise, the arc width Wa can be constant or vary along arc 5500.

Figure 9:
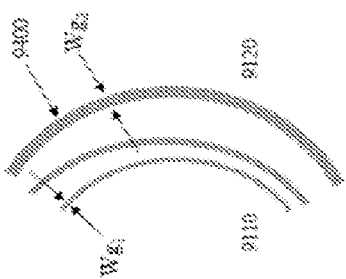
FIG. 9 illustrates a spiralesque resistive bridge with a gap that varies in width.
Figure 8:
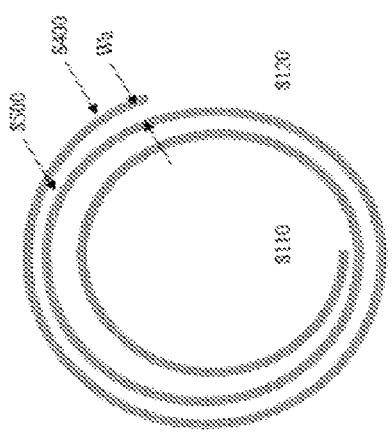
FIG. 8 illustrates a spiralesque resistive bridge with a width that varies.
Figure 7:
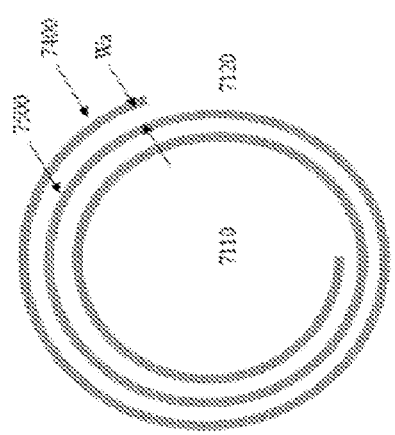
FIG. 7 illustrates a spiralesque resistive bridge with a constant width.

FIGS. 7-9 illustrate additional aspects of resistive bridge geometry. FIG. 7 shows neighboring electrodes 7110 and 7120 that are substantially separated by spiralesque gap 7400, which defines a substantially constant arc width Wa at each location along spiralesque arc 7500. In contrast, in FIG. 8, neighboring electrodes 8110 and 8120 are substantially separated by spiralesque gap 8400 with an arc width Wa that varies. FIG. 9 shows electrodes 9110 and 9120 that are substantially separated by spiralesque gap 9400, which varies in width from a relatively thin width Wg1 in the innermost revolution of gap 9400 to a relatively wide width Wg2 in the outermost revolution of gap 9400.

Lens Electronics

Each inventive liquid crystal lens (e.g., lenses 100, 100', 200, 200', and 300 described above) may include or be coupled to electronics for actuating the liquid crystal material in order to change the lens's focal length. The control electronics provide an alternating current, for example, a sine or square wave that oscillates at frequency from 1 Hz to 20 kHz and peak-to-peak amplitude that ranges from zero volts to 500 volts. These electronics may include a sensor, such as a rangefinder or tilt switch, that detects where a person wearing the lens is looking. It may also include a wireless interface, including an antenna and transceiver, for receiving wireless commands to change focus from an external device, such as a fob or smartphone, controlled and actuated by the wearer and for transmitting device information to the external device. The antenna may take the form of a ring-shaped or annular piece of metal disposed along or near the lens's outer edge.

The wireless interface and optional sensor are coupled to a processor or controller, such as a suitably microprocessor or integrated circuit, that applies a voltage directly to the ring electrodes or actuates one or more voltage supplies that apply voltage(s) to the ring electrodes. The processor, wireless interface, optional sensor, and optional voltage are powered by a battery, capacitor, or other suitable power supply, which can be recharged via the antenna or another coil uses using inductive or magnetic resonance charging.

The electronics, including the antenna and optional separate charging coil, can be embedded in one of the lens's substrates or sandwiched between the substrates. The antenna and/or optional separate charging coil can also be on the surface of one substrate or along a seam between substrates and connected to the electronics via one or more conductive traces.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein.

The foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electro-active lens comprising:
a first substrate having an even surface;
a second substrate having a stepped surface opposite the even surface, the stepped surface having at least a first step and a second step;
liquid-crystal material disposed between the even surface and the stepped surface;
a ground electrode disposed on one of the even surface or the stepped surface; and
a plurality of ring electrodes, disposed on the other of the even surface or the stepped surface, to apply a voltage across the liquid-crystal material, the plurality of ring electrodes comprising at least two ring electrodes for the first step and at least two ring electrodes for the second step.

2. The electro-active lens of claim 1, wherein the even surface is a planar surface.

3. The electro-active lens of claim 1, wherein the even surface is a curved surface.

4. The electro-active lens of claim 1, wherein the stepped surface is formed by stacked cylinders of different diameters concentric with an optical axis of the electro-active lens.

5. The electro-active lens of claim 1, wherein the first step is higher than the second step by a height selected to provide an optical path distance equal to an integer number of waves at a design wavelength of the electro-active lens.

6. The electro-active lens of claim 1, wherein the first step has a circular face opposite the even surface and centered on an optical axis of the electro-active lens and the second step has an annular face concentric with the circular face and opposite the even surface.

7. The electro-active lens of claim 6, wherein the circular face is separated from the planar surface by a first distance and the annular face is separated from the even surface by a second distance greater than the first distance.

8. The electro-active lens of claim 6, wherein the ground electrode is disposed on the stepped surface and the plurality of ring electrodes is disposed on the even surface with the at least two ring electrodes for the first step opposite the circular face and the at least two ring electrodes for the second step opposite the annular face.

9. The electro-active lens of claim 6, wherein the ground electrode is disposed on the even surface and the plurality of ring electrodes is disposed under the stepped surface with the at least two ring electrodes for the first step under the circular face and the at least two ring electrodes for the second step under the annular face.

10. The electro-active lens of claim 6, wherein the ground electrode is disposed on the even surface and the plurality of ring electrodes is disposed on the stepped surface with the at least two ring electrodes for the first step on the circular face and the at least two ring electrodes for the second step on the annular face.

11. The electro-active lens of claim 10, further comprising:
a buss line, disposed on a cylindrical face connecting the circular face and the annular face, to connect at least one of the at least two ring electrodes for the first step to a voltage supply.

12. The electro-active lens of claim 1, wherein the at least two ring electrodes for the first step include a first electrode having a first diameter and a first width and the at least two ring electrodes for the second step include a second electrode having a second diameter greater than the first diameter and a second width greater than the first width.

13. The electro-active lens of claim 1, wherein the plurality of ring electrodes comprises at least ten ring electrodes for the first step and at least ten ring electrodes for the second step.

14. The electro-active lens of claim 1, wherein each of the at least two ring electrodes for the first step has a first area and each of the at least two ring electrodes for the second step has a second area greater than the first area.

15. The electro-active lens of claim 1, further comprising:
a first resistive bridge connecting two of the at least two ring electrodes for the first step; and
a second resistive bridge connecting two of the at least two ring electrodes for the second step.

16. The electro-active lens of claim 1, wherein the first step is closer than the second step to an optical axis of the electro-active lens, and further comprising:
a first spacer bead having a first diameter between the first step and the even surface; and
a second spacer bead having a second diameter greater than the first diameter between the second step and the even surface.

17. A method of focusing light with an electro-active lens comprising a first substrate having an even surface, a second substrate having a stepped surface opposite the even surface and having at least a first step and a second step, liquid-crystal material disposed between the even surface and the stepped surface, and a plurality of ring electrodes, the method comprising:
actuating a first portion of the liquid-crystal material between the first step and the even surface with a voltage applied to at least two inner ring electrodes in the plurality of ring electrodes; and
actuating a second portion of the liquid-crystal material between the second step and the even surface with a voltage applied to at least two outer ring electrodes in the plurality of ring electrodes.

18. An electro-active lens comprising:
a first substrate having an even surface;
a second substrate having a stepped surface opposite the even surface, the stepped surface having at least a first step and a second step with a height difference between the first step and the second step selected to provide an optical path length equal to an integer number of wavelengths at a design wavelength of the electro-active lens;
liquid-crystal material disposed between the even surface and the stepped surface;
a ground electrode disposed on the stepped surface; and
a plurality of ring electrodes, disposed on the even surface, to apply a voltage across the liquid-crystal material, the plurality of ring electrodes comprising at least ten ring electrodes opposite the first step and at least ten ring electrodes opposite the second step.

19. The electro-active lens of claim 18, wherein the at least ten ring electrodes opposite the first step include a first electrode having a first diameter and a first width and the at least ten ring electrodes for the second step include a second electrode having a second diameter greater than the first diameter and a second width greater than the first width.

20. The electro-active lens of claim 18, wherein each of the at least ten ring electrodes for the first step has a first area and each of the at least ten ring electrodes for the second step has a second area greater than the first area.

21. The electro-active lens of claim 18, wherein the plurality of ring electrodes comprises at least one hundred ring electrodes for the first step and at least one hundred ring electrodes for the second step.

22. The electro-active lens of claim 18, further comprising:
a first resistive bridge connecting two of the at least ten ring electrodes opposite the first step; and
a second resistive bridge connecting two of the at least ten ring electrodes opposite the second step.

23. An electro-active lens comprising:
a first substrate having an even surface;
a second substrate having a stepped surface opposite the even surface, the stepped surface having at least a first step and a second step;
liquid-crystal material disposed between the even surface and the stepped surface;

a ground electrode disposed on the stepped surface;

a plurality of first ring electrodes, disposed on the even surface opposite the first step, to apply a first voltage across the liquid-crystal material, each first ring electrode in the plurality of first ring electrodes having a first area; and a plurality of second ring electrodes, disposed on the even surface opposite the second step, to apply a second voltage across the liquid-crystal material, each second ring electrode in the plurality of second ring electrodes having a second area greater than the first area.

24. The electro-active lens of claim 23, wherein the plurality of first ring electrodes comprises at least one hundred first ring electrodes and the plurality of second ring electrodes comprises at least one hundred second ring electrodes.

25. The electro-active lens of claim 23, further comprising:

a first resistive bridge connecting two first ring electrodes in the plurality of first ring electrodes; and a second resistive bridge connecting two second ring electrodes in the plurality of second ring electrodes.

26. An electro-active lens comprising:

a first substrate having a curved surface;

a second substrate having a stepped surface opposite the curved surface, the stepped surface having at least a first step and a second step;

liquid-crystal material disposed between the curved surface and the stepped surface;

a ground electrode disposed on the stepped surface; and a plurality of ring electrodes, disposed on the curved surface, to apply a voltage across the liquid-crystal material, the plurality of ring electrodes comprising at least ten ring electrodes opposite the first step and at least ten ring electrodes opposite the second step.

27. The electro-active lens of claim 26, wherein there is a height difference between the first step and the second step selected to provide an optical path length equal to an integer number of wavelengths at a design wavelength of the electro-active lens.

28. The electro-active lens of claim 26, wherein the at least ten ring electrodes opposite the first step include a first electrode having a first diameter and a first width and the at least ten ring electrodes opposite the second step include a second electrode having a second diameter greater than the first diameter and a second width greater than the first width.

29. The electro-active lens of claim 26, wherein each of the at least ten ring electrodes opposite the first step has a first area and each of the at least ten ring electrodes opposite the second step has a second area greater than the first area.

30. The electro-active lens of claim 26, wherein the plurality of ring electrodes comprises at least one hundred ring electrodes opposite the first step and at least one hundred ring electrodes opposite the second step.

31. The electro-active lens of claim 26, further comprising:

a first resistive bridge connecting two of the at least ten ring electrodes opposite the first step; and a second resistive bridge connecting two of the at least ten ring electrodes opposite the second step.

* * * * *